March 17, 1931.  H. EDELMAN  1,796,685
ANTISIPHON TRAP FOR DRAINING SYSTEMS
Filed Oct. 15, 1929
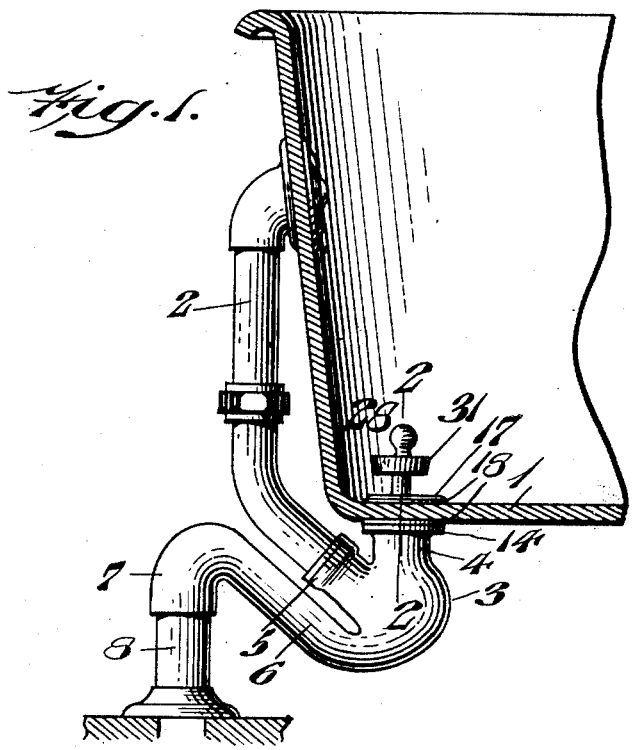
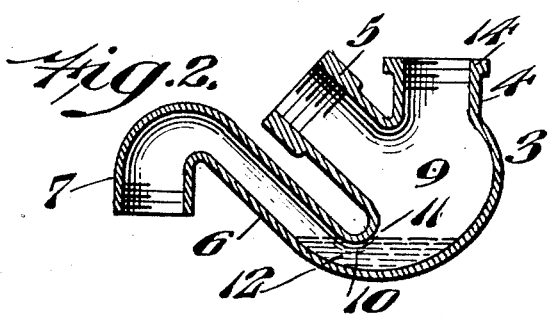
INVENTOR:
HENRY EDELMAN
BY
ATTORNEYS:

Patented Mar. 17, 1931

1,796,685

UNITED STATES PATENT OFFICE

HENRY EDELMAN, OF PHILADELPHIA, PENNSYLVANIA

ANTISIPHON TRAP FOR DRAINING SYSTEMS

Application filed October 15, 1929. Serial No. 399,748.

My invention relates to a new and useful anti-siphon trap for draining systems.

As is well known, the draining system of any house or building includes several interconnected fixtures such as bath tubs, sinks, toilets, and wash stands on various floors or on the same floor, such fixtures being equipped with the siphon type of trap and all leading or emptying into a common drain pipe leading to the sewer. In constructions of this character, the flushing or draining of any one sink, tub, or wash stand usually resulted in siphoning the water out of the traps of other adjacent, interconnected tubs, sinks, or wash stands, thereby permitting the sewer gas to seep up through said traps with disastrous results. Various attempts to overcome this objection have either been not entirely successful or have resulted in expensive, complicated structures which necessitated frequent replacement and repair.

It is the object of my invention to provide an anti-siphon trap whereby the foregoing and other disadvantages are entirely eliminated, to the end that the trap of each separate receptacle is at all times thoroughly sealed to prevent the seepage of sewer gas.

To the above ends, my invention consists of a novel trap adapted to be installed intermediate the intake end of a drain pipe and the waste outlet of a plumbing fixture such as a tub or the like, said trap comprising a bowl, a branch pipe leading to the overflow of said fixture, and an inclined branch pipe extending upwardly and at a predetermined angle leading to the drain pipe, said inclined branch pipe being of such cross-sectional area and being inclined at such an angle with respect to said bowl, as to prevent the siphoning of the water in said bowl when said fixture or an adjacent interconnected fixture is flushed, thereby maintaining said trap thoroughly and effectively sealed at all times.

My invention further consists of various other novel features of construction and advantage all as hereinafter described and claimed.

For the purpose of illustrating my invention I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

In the accompanying drawings:

Fig. 1, represents a fragmentary view partly in section and partly in elevation showing a bath tub equipped with an anti-siphon trap embodying my invention.

Fig. 2, represents a sectional view of the antisiphon trap shown in Fig. 1, and forming part of my invention.

Referring to the drawings, in which like reference characters indicate corresponding parts, 1 designates a bath tub, sink, wash stand or other plumbing fixture provided with the overflow pipe 2, and the trap 3, best seen in Figs. 1 and 3. The trap 3 comprises the upright intake end 4 which engages the bottom of the tub 1, the inclined branch pipe 5, which receives the lower end of the overflow pipe 2, and the elongated, downwardly tapering inclined branch 6 having the downwardly deflected pendant portion 7 which engages the upper end of the drain pipe 8. My novel trap 3 is provided with the enlarged portion or bowl 9 which is reduced to form a neck portion 10 intermediate the bottom of the bowl 9 and the elbow 11, said neck or reduced portion 10 being positioned at the lowermost point of the trap 3, as will be seen from Figs. 1 and 7.

This construction of my trap 3 prevents the complete siphoning of the water therein when the tub 1, to which said trap is applied, or when any other plumbing fixture which is connected to the same draining system is flushed or drained, and the operation of my novel trap is as follows:

As will be seen from Fig. 7, it requires a relatively small amount of water 12 to seal my novel trap, this being due to the proximity of the elbow portion 11 to the bottom of the trap 3, which forms the reduced neck portion 10. Thus, when the tub 1 or a sink or other fixture (not shown) which is connected to the same draining system as the tub 1, is drained, the water in the trap 3 is sucked upwardly into the inclined downwardly tapering branch pipe 6 in the usual manner, but before said water reaches the pendant portion 7 and the drain pipe 8, an air passage is established through the trap 3, since the amount of water 12 which is enough to seal the bottom of the bowl 9 at its junction with the lower tapered end of the pipe 6, is not enough to fill the elongated branch pipe 6. The establishment of the air passage through the trap 3 naturally relieves the suction or siphoning action on the water 12 which now flows back into the bottom of the bowl 9 to seal the latter. It is thus apparent that except for the formation of the restricted passage 10 and the provision of the elongated, inclined, downwardly tapering branch pipe 6, forming part of the bowl 9 of my novel trap 3, this result could not be accomplished, since the siphoning action on the water 12 in the bowl 9 would continue until the amount of water left in the bottom of said bowl is not sufficient to seal the bottom thereof. In other words, in the absence of the restricted passage 10 and the elongated, inclined, downwardly tapering pipe 6, the amount of water necessary to seal the trap 3 would be sufficient to fill the branch pipe 6 (if said pipe were short, not inclined, and not tapered to increase its volumetric capacity without correspondingly enlarging the passage 10), thus permitting the suction and siphoning action to continue, and when such action ceases, it will be found that the amount of water flowing back from the inclined branch 6 into the bottom of the bowl 9 is not sufficient to seal the latter. It will be understood from the foregoing that the volumetric capacity of the elongated chamber within the inclined branch pipe 6 is greater than the cubic volume of water contained in the bottom of the bowl 9, when the water level therein is above the top of the restricted passage 10.

The upper end 4 of the trap 3 is provided with the upper annular flange 14, and is adapted to engage the threaded bushing 15 which is provided with the bottom, inwardly projecting annular flange 16 and with the top, outwardly projecting annular flange 17. 18 designates gaskets or other suitable packing to produce a water tight joint between the bushing 15 and the upper end 4 of the trap 3, as will be understood from Fig. 2.

My novel trap 3 is also self cleaning since the bowl 9 thereof is connected directly to the bath tub outlet and without the intervention of T-pipes or the like, which tend to decrease the velocity of the water flowing through the trap, thereby tending to increase the accumulation of sediment. In my novel trap, on the other hand, the entire force of the rapidly flowing water as it flows from the tub 1 and passes through the trap 3 is exerted upon the bottom of the bowl 9 of said trap, thereby keeping the latter constantly clean and scoured.

I am aware that the invention may be embodied in other specific forms without departing from the spirit or essential attributes of the invention, and I therefore desire the present embodiment to be considered in all respects as illustrative and not restrictive, reference being had to the appended claims rather than the foregoing description to indicate the scope of the invention.

Having thus described my invention, what I claim as new, and desire to secure by Letters Patent, is:

1. An antisiphon trap of the character stated, comprising a bowl adapted to be connected to the waste outlet of a tub or the like, an upwardly inclined pipe leading from said bowl to the overflow of said tub, and a lower inclined elongated branch pipe leading from the lowermost portion of said bowl to a drain pipe, the passage at the junction of said lower branch pipe with said bowl being shallow and restricted, and the upper wall of said pipe at said junction being below the level of the liquid seal within said bowl, the volumetric capacity of said lower elongated branch pipe being greater than the cubic volume of water in said bowl, when said water is enough to seal said restricted passage.

2. An antisiphon trap for draining systems, comprising an enlarged bowl forming an air chamber, an upright inlet therefor, threaded fastening means for detachably securing said inlet to the waste outlet in the bottom of a tub or other fixture, an upwardly inclined inlet adapted to be detachably secured to the overflow pipe of said tub or fixture, an elongated inclined downwardly tapered outlet pipe having its lower tapered end joined to said bowl at a point below the lower end of said upwardly inclined inlet to form a restricted passage and having its upper end enlarged and deflected downwardly for connection to a waste pipe, the upper end of said inclined outlet pipe being below said upright and upwardly inclined inlets, and the volumetric capacity of said inclined outlet pipe being greater than the volume of water necessary to seal the restricted passage formed at the lower tapered end of said pipe.

HENRY EDELMAN.